Patented May 30, 1950

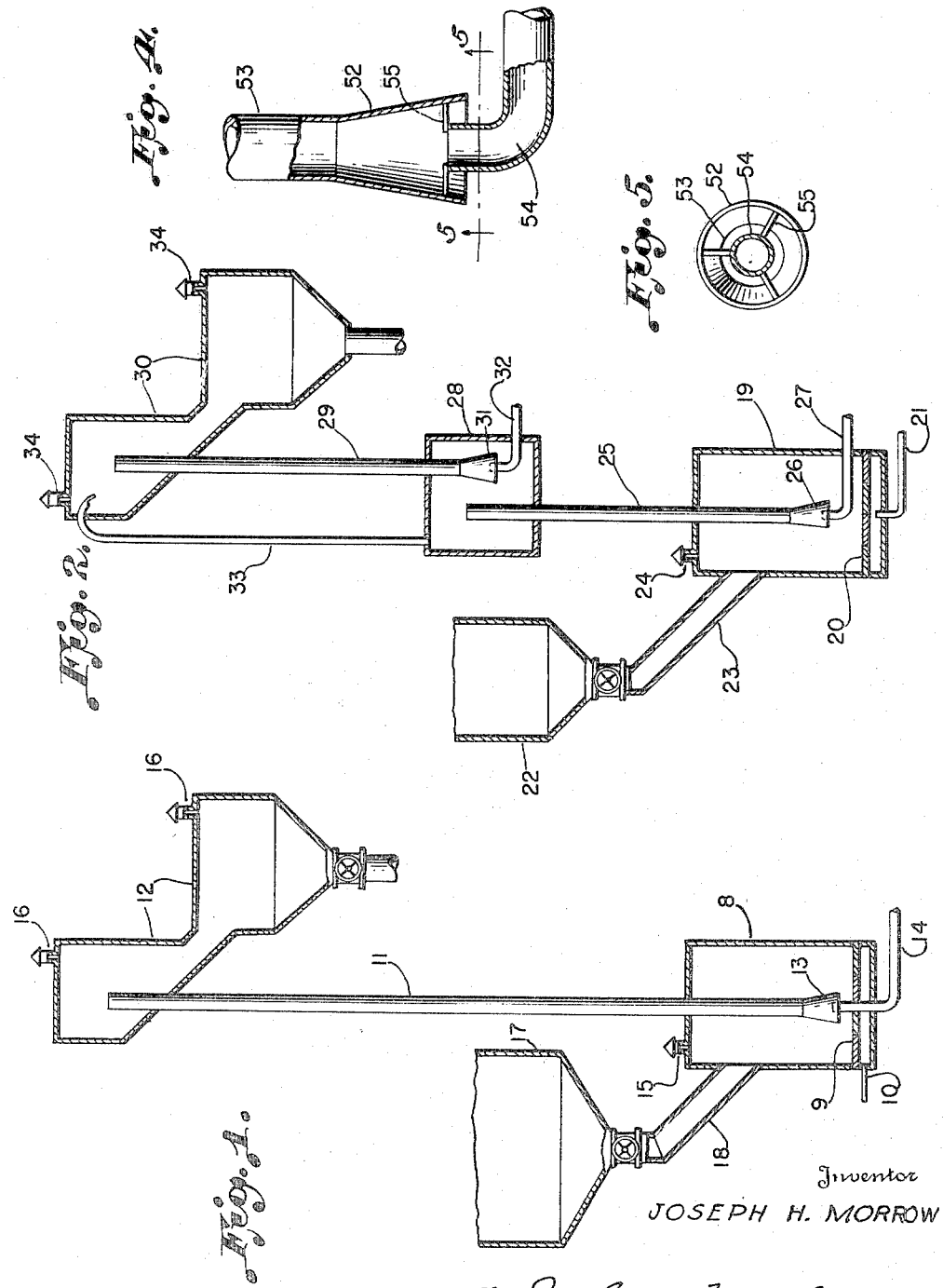

2,509,983

UNITED STATES PATENT OFFICE 2,509,983

METHOD AND APPARATUS FOR HANDLING PULVERULENT MATERIALS

Joseph H. Morrow, Hokendauqua, Pa., assignor to Fuller Company, Catasauqua, Pa., a corporation of Delaware Application October 17, 1946, Serial No. 703,859

3 Claims. (Cl. 302—52)

This invention relates to the handling of pulverized materials and finely divided solids, such, for example, as cement, cement raw materials, pulverized coal, lime, soda ash, powdered catalysts, fertilizers, and any similar materials, which have the characteristic of becoming fluent when admixed with air or other inert gas in appropriate proportions. More particularly, the invention has to do with a novel method for the continuous delivery of such materials at an elevated point at a substantially constant rate, which is simple and economical to operate. The invention further comprehends apparatus for the practice of the method, which is compact, contains no moving parts or complicated control mechanisms, and may be incorporated in various existing installations with little alteration thereof. In addition to its use for the elevation of pulverulent materials, the new apparatus may, with particular advantage, be combined with a constant head vessel and a volumetric feeder to effect continuous delivery of material of substantially constant unit weight at a uniform rate in such applications as a powdered coal feeder, a raw material feeder for a rotary kiln, or a packing apparatus for packaging such materials as lime or cement. The use of the invention in such a combination is described and claimed in my copending patent applications Serial Nos. 703,860 and 703,861, both filed October 17, 1946. The invention finds a further important application in the blending of pulverulent materials in a bin or silo.

The handling, conveying, and packaging of large tonnages of finely ground or powdered substantially dry materials is a major problem in many manufacturing operations. In a cement plant, for example, the handling and packaging of finished cement requires extensive installations, as does also the handling of pulverized coal and dry cement raw materials. Numerous pneumatic or mechanical methods, or combinations thereof, have heretofore been proposed for conveying and elevating such pulverulent materials and a number of those methods are in successful operation. The necessary installations, however, are usually substantial and frequently consume much power.

In many instances, it is desired to elevate the material a relatively short distance and, for that purpose, the installation of equipment capable of conveying and elevating over long distances is not warranted. In such cases, mechanical means, such as bucket elevators, are frequently resorted to, but the operating disadvantages inherent in those devices make their use generally undesirable. It has also been proposed to employ the "air jet" principle for elevating pulverulent materials, and, for this purpose, high pressure air is passed into a pipe below the surface of the powdered material to produce an aspirator effect on expansion. Various expedients have been employed for delivering the material at a constant rate into the zone in which the expanding air picks it up and sweeps it up the pipe, but such expedients have not proved satisfactory in practice. Other suggested methods involving the use of reduced pressure in a receiver or of positive pressure in a lower storage tank, often referred to as a "blow tank," require equipment of considerable mechanical complexity to insure a closed pressure system. Furthermore, the control mechanisms and the safety requirements involved make the use of such systems of doubtful value in plant practice, where an elevation or conveyance over substantial distances is not contemplated.

The present invention is, accordingly, directed to the provision of a method for elevating pulverulent materials, which makes use of a principle of operation different from those heretofore employed and is not subject to the disadvantages of the prior systems. In the practice of the new method, I employ a generally vertical pipe or conduit having an intake below the top of the material to be elevated, and introduce an inert gas, such as air, into the material in an amount and in a manner suitable to render it fluent. The fluidizing treatment causes the pulverulent material to have a tendency to enter the inlet of the pipe and, additional air is then introduced into the fluent material within the pipe at a point near its inlet in such volume and at such velocity that the fluidized material rises in the pipe above the level of the main body of material.

In the following, I use the term "fluidize" to refer to an operation in which an inert gas, such as air, is diffused through a body of finely divided solid material in an amount and in a manner appropriate to produce a substantially homogeneous mixture of entrained gas and solids, which is fluent or free flowing and possesses, to a marked degree, the properties of a liquid. By the phrase "pulverulent materials," I mean any solid material which, when relatively dry, possesses properties and is of a particle size and shape, such that when properly "aerated" or "fluidized" it assumes fluent properties above described.

In order that my invention may be clearly understood, it will be described with reference to the accompanying drawings in which:

Fig. 1 is a vertical diagrammatic view, partly in section, of an apparatus for the practice of the new method;

Fig. 2 is a vertical diagrammatic view, partly in section, of a multi-stage elevating apparatus;

Fig. 4 is an enlarged detail of the intake section of an outlet pipe of the type used in Fig. 3; and Fig. 5 is a horizontal section on line 5—5 of Fig. 4.

Figure 3:
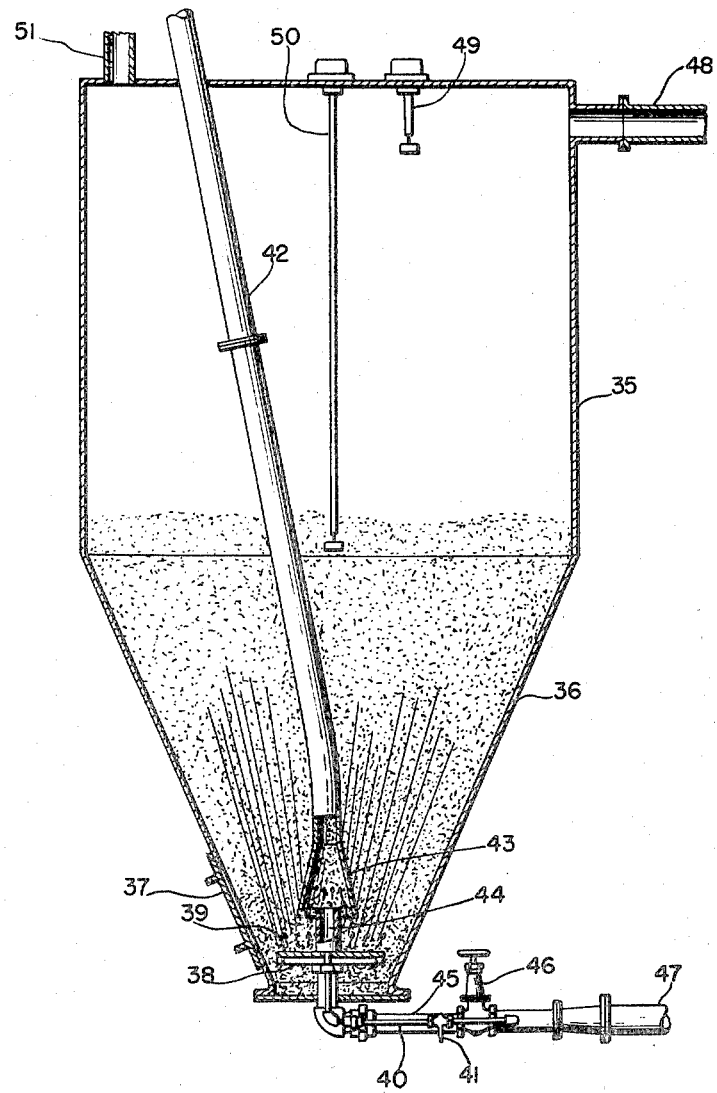
Fig. 3 is a vertical section showing details of construction of a preferred form of the apparatus.

The apparatus illustrated in Fig. 1 includes a bin or tank 8 for containing the pulverulent material to be elevated and the bin may be of any usual form and have either a flat or conical bottom. Gas diffusing means 9 are mounted within the bin near its lower end and various devices, such as air rings or perforated plates, may be used for the purpose, although I prefer to employ a porous medium of high gas permeability, such as porous brick or stone or the porous media now obtainable commercially in the form of flat plates made of granular alumina, etc. Such plates produce a satisfactory surface aeration effect and may be operated with a relatively low gas pressure differential. They may be installed in horizontal or other positions, as required, and are supplied, preferably by a blower or fan, with air at low pressure, that is, below 15 pounds, through a line 10.

The material to be elevated passes from the bin through an elevating conduit or lift pipe 11, which extends in a generally upward direction from the interior of the bin and leads to the desired delivery point, illustrated as a hopper-bin receiver 12. The lower section or intake 13 of pipe 11 is preferably conical in form and a pipe 14, connected with any suitable source of low pressure air, leads to the lower end of the intake and preferably extends into it a short distance. The bin 8 is vented to the atmosphere through an outlet 15 and the receiver 12 is similarly vented through outlets 16. In the handling of certain materials, it may be desirable to connect some or all of these outlets to a dust collecting system, but such an arrangement will not reduce the pressure in the bin and receiver to any considerable extent, and, in all cases, the interiors of the bin and receiver will be at atmospheric, or approximately atmospheric, pressure.

In some applications of the invention, the container 8 serves merely as an intermediate vessel for fluidization of the material and the main supply of the material is stored in a container 17 situated at a remote point and connected to the bin by a transport line 18. If desired, the line may include mechanical or pneumatic conveying means to insure that the material will be continuously supplied to the bin and the material level therein kept within desired limits.

In the practice of the new method by the apparatus described for the continuous elevation of material, a supply of the material is continuously maintained in the bin 8, with the level of the material within the bin at a substantial height above the lower end of the intake 13 of the lift pipe 11. Air is supplied through line 10 to the diffusing means at a pressure of, for example, 3 to 5 pounds, and air at about the same pressure and in substantially larger volume is supplied through the line 14 to be discharged into the material at the lower end of the intake. As a result of the action of the air introduced through the diffusing means, the body of material enclosing the intake becomes fluent and tends to rise within the intake 13 into the path of the air issuing from the pipe 14. As a result, the density of the material is further reduced and it travels through the lift pipe with the air and is discharged at the top of the pipe in a continuous flow. The fluidized material in the bin continuously flows down and into the lower end of the intake to replace the material that has risen through the lift pipe and the operations continue indefinitely.

Experimentation with the apparatus described has shown that aeration of the material to be elevated is essential to the practice of the method and that the lifting capacity of the apparatus depends on proper aeration of the material, and also on the head of the material in the bin. When the material is being properly aerated, it seethes as if in gentle ebullition, but without evidence of jets of air issuing from the surface. If less air is supplied to the material than is necessary for proper aeration, the capacity of the apparatus decreases. Similarly, when the material is properly aerated, a minimum head of material above the end of the intake of the lift pipe is necessary in order that the equipment may operate at full capacity, and, if the head is reduced below that minimum, the capacity decreases. The apparatus, however, will continue to elevate material, until the head decreases to a value of the order of 6″.

The pressure and volume of the air supplied at the intake of the lift pipe is also important and it appears that the air should be supplied at such pressure and in such volume that the material and air will flow through the pipe at a velocity between 50′ and 60′ per second. The volume of air supplied to the intake is substantially greater than that required for aeration of the material, as, for example, in a particular operation, the air supplied to the intake amounted to about 1140 cu. ft. per min. and that for aeration to about 60 cu. ft. per min. Best results are obtained when the end of the air supply pipe extends into the intake about 2″ or 2½″. Further insertion of the end of the air pipe into the intake has little effect, but, as the end of the pipe is withdrawn from the intake, the lifting capacity of the apparatus diminishes.

The height to which the material may be elevated is a function of the properties of the material and of the characteristics of the particular apparatus used. Accordingly, there is a practical limit beyond which a particular material cannot be elevated in a specific installation. If it is desired to elevate the material beyond that limit, the operation may be performed in stages by such apparatus as is shown in Fig. 2. The apparatus referred to includes a bin 19 provided with air diffusing means 20 mounted within its lower end and supplied with air through a line 21. The material to be elevated is stored in a container 22, from which it is delivered through a conduit 23 to the interior of the bin 19. The bin is vented at 24. A lift pipe 25 having an intake 26, preferably conical in form, at its lower end, leads from the interior of bin 19 and air is supplied to the interior of the intake 26 through a line 27. The pipe 25 extends into an intermediate container 28 and terminates well above the bottom thereof and a lift pipe 29 extends from the interior of container 28 into the hopper-bin receiver 30. Pipe 29 has a conical intake 31 at its lower end and air is introduced into the lower end of the intake 31 through an air supply line 32. In order to equalize pressure in the container 28 and the receiver 30, a vent pipe 33 leads from the top of the container into the receiver above the level of the material therein. As in the Fig. 1 construction, the receiver is provided with vents 34.

In the continuous elevation of material by means of the apparatus shown in Fig. 2, a quantity of material is continuously maintained in the bin 19 at a level above the lower end of the intake 26 of the lift pipe 25. The material is rendered fluent by air introduced through the diffusing means 20 and, as the fluidized material rises through the intake, additional air is introduced into it through line 27. The material rises through pipe 25 and is discharged into vessel 28, where it accumulates until there is a head of material above the lower end of intake 31 of pipe 29. The material is still fluent, so that it does not require aeration within vessel 28. The material enters intake 31 and additional air is introduced into the material through line 32. The material then rises through pipe 29 to be discharged into the receiver 30.

The specific form of apparatus illustrated in Fig. 3 includes a number of features which have been found in practice to be particularly advantageous. The apparatus includes a bin 35 having a conical lower end section 36 which has a cleanout opening closed by a door 37. The fluidizing means comprises a housing 38 mounted within the conical section 36 near its lower end and carrying porous plates or aeration blocks 39. Air is supplied to the housing through a line 40 containing a control valve 41 and escapes through the plates into the material within the bin. The material is conducted from the bin through a lift pipe 42 having an intake 43 of conical form at its lower end. Air is introduced into the intake through a nozzle 44 which terminates within the end of the intake, and is supplied with air through a pipe 45 provided with a control valve 46. Air pipes 40 and 45 are supplied from a common supply line 47.

The material to be elevated is introduced into bin 35 through a line 48 leading from a supply container and the bin is equipped with high and low signal devices 49, 50, which may be of conventional form and either indicate the level of the material or operate well-known automatic controls. The bin is provided with a vent 51.

While the intake of the lift pipe may be cylindrical and merely a part of the pipe, I have found that it is advantageous to give the intake the form of a truncated cone, with its wall making an angle of about 10° to the wall of the lift pipe, as shown in Figs. 4 and 5. Such a conical intake provides improved mixing of the fluent material and supplementary air and also permits flow of material from the main body into the intake with little friction loss, since the annular opening between the air nozzle and the wall of the intake may have an area substantially greater than the cross-sectional area of the elevating conduit.

The air nozzle may be supplied through an air line extending through the bottom of the bin, as in the Fig. 1 construction, or, if desired and as shown in Figs. 4 and 5, air may be supplied to the material within the intake 52 of pipe 53, through an air supply line 54, which extends through a side wall of the bin and terminates in an elbow, one end of which is centered within the intake by vanes 55.

The method of the invention can be used to elevate pulverulent materials to a substantial height and at a rapid rate. For example, an apparatus provided with a lift pipe 8" in diameter and 13' long was operated to elevate ordinary Portland cement at the rate of about 330 barrels per hour with air supplied at about 3.5 pounds pressure and in a volume of about .6 cu. ft. per pound of cement lifted. Under those conditions, the material and air traveled through the lift pipe at a velocity of about 58 feet per second.

In addition to its use for elevating purposes, the use of the method makes it possible to realize valuable economies in the blending of pulverulent materials contained in a bin or silo. Frequently batches of material varying in their properties are placed in the same storage vessel and blending of these fractions is necessary, in order that the material delivered may be uniform in properties. Such blending may be accomplished by elevating the material from a bin into a receiver and then returning the material from that receiver to the bin. Upon passage of the material through the circuit described a number of times, the material being handled will be found to have been blended and become uniform. If the bin is of sufficient size to contain all the material to be blended, the blending may be effected by causing the discharge from the elevating pipe to be returned directly to the bin or a pipe terminating within the bin may be used, so that the material will merely spill over the top of the pipe and fall back upon the body of material within the bin.

I claim:

1. Apparatus for elevating pulverulent material, which comprises a bin for holding a quantity of the material, means for maintaining the interior of the bin at substantially atmospheric pressure, a generally vertical pipe leading upwardly from the interior of the bin and having an open intake at its lower end, gas diffusing means lying beneath the intake and of larger area than the open end thereof through which an inert gas may be diffused into the pulverulent material in the bin in sufficient volume to fluidize it and render it sufficiently fluent to enter the intake and rise therein, and means for introducing the gas in substantially greater volume into the material within the intake to cause the material to travel upwardly with the gas through the pipe, said means including a pipe extending through the wall of the bin and having an end portion extending into the intake thereof and terminating above the level of the open end thereof.

2. Apparatus for elevating pulverulent material, which comprises a bin for holding a quantity of the material, means for maintaining the interior of the bin at substantially atmospheric pressure, a generally vertical pipe leading upwardly from the interior of the bin, the pipe having an intake of frusto-conical form at its lower end, gas-diffusing means within the bin positioned beneath the intake and of larger area than the open end thereof through which an inert gas may be diffused into the pulverulent material in the bin in such volume as to fluidize such material and to render it sufficiently fluent to enter said intake and rise therein, and means for introducing an inert gas in substantially greater volume and at low pressure into the material within the intake to cause the material to travel upwardly with the gas through the pipe, said means including a pipe extending through the wall of the bin and having an end portion extending into the intake substantially coaxially thereof and terminating above the level of the open end thereof, and means for supplying gas under pressure to said pipe.

3. A method of elevating pulverulent material from a body of such material contained within a bin through a generally vertical pipe leading upwardly from the interior of the bin and having an intake at its lower end lying within the body of material, which comprises maintaining the bin at atmospheric pressure, introducing an inert gas at relatively low pressure into the material below the lower end of the intake in such volume and manner as to render the material sufficiently fluent to enter the intake and rise therein, and introducing the gas at substantially the same pressure and in substantially greater volume into the intake above the plane of the lower end thereof and in a direction toward the pipe.

JOSEPH H. MORROW.

REFERENCES CITED

The following references are of record in the file of this patent:

UNITED STATES PATENTS

| Number | Name | Date |
|---|---|---|
| 727,030 | Tilghman | May 5, 1903 |
| 1,339,977 | Pruden | May 11, 1920 |
| 1,347,358 | Adams | July 20, 1920 |
| 1,390,974 | Von Porat | Sept. 13, 1921 |
| 1,566,536 | Hoving | Dec. 22, 1925 |
| 2,125,913 | Goebels | Aug. 9, 1938 |
| 2,255,438 | Robinson | Sept. 9, 1941 |
| 2,316,814 | Schemm | Apr. 20, 1943 |